March 31, 1964 E. ZILLMER 3,126,785
SLIDE PROJECTOR WITH INTERCHANGEABLE LAMP HOUSING COMPONENTS
Filed Dec. 22, 1960 3 Sheets-Sheet 1

INVENTOR
Erich Zillmer
BY
Blum, Moscovitz, Friedman & Blum
ATTORNEYS

March 31, 1964  E. ZILLMER  3,126,785
SLIDE PROJECTOR WITH INTERCHANGEABLE LAMP HOUSING COMPONENTS
Filed Dec. 22, 1960  3 Sheets-Sheet 2

INVENTOR
Erich Zillmer
BY
Blum, Moscovitz, Friedman & Blum
ATTORNEYS

March 31, 1964  E. ZILLMER  3,126,785
SLIDE PROJECTOR WITH INTERCHANGEABLE LAMP HOUSING COMPONENTS
Filed Dec. 22, 1960  3 Sheets-Sheet 3
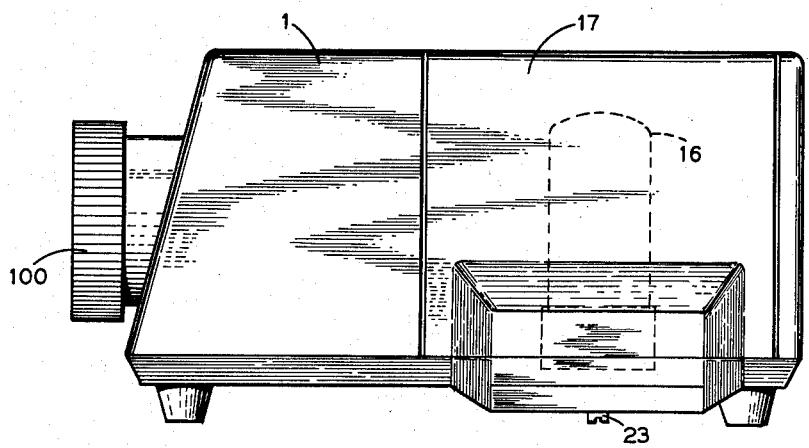
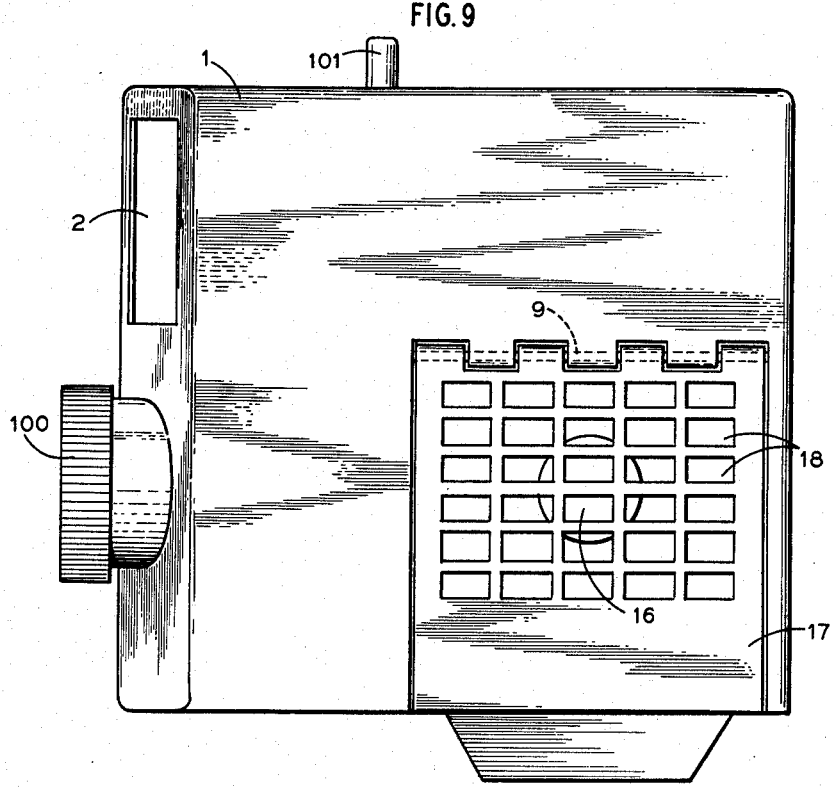
INVENTOR.
Erich Zillmer
ATTORNEYS

United States Patent Office 3,126,785
Patented Mar. 31, 1964

3,126,785
SLIDE PROJECTOR WITH INTERCHANGEABLE
LAMP HOUSING COMPONENTS
Erich Zillmer, Braunschweig, Germany, assignor to Voigtländer A.G., Braunschweig, Germany, a corporation of Germany
Filed Dec. 22, 1960, Ser. No. 77,601
Claims priority, application Germany Dec. 23, 1959
7 Claims. (Cl. 88—24)

This invention relates to slide projectors and, more particularly, to a slide projector of this type comprising a basic casing unit with which may be interchangeably connected different lamp compartment cover components for adapting the slide projector for use with projector lamps of various light output and voltage ratings.

The fundamental design of slide projectors differs in accordance with the size of the projection lamps. Thus, slide projectors utilizing a projector lamp having a low wattage or light output rating need not be equipped with any mechanical cooling means, such as a fan or blower, as the natural air circulation through the lamp housing induced by up-draft of heated air is adequate for cooling of the illuminating system and other parts of the projector. On the other hand, where the lamp used with the projector is of a substantially higher wattage or light output rating, special electric motor driven cooling means are incorporated into the projector housing. Also, projectors equipped with lamps having voltage ratings differing from that of the usual electrical supply mains are provided with built-in transformers to provide the rated operating voltage for the lamp. These transformers have their primary windings supplied with potential at the voltage of the supply mains, and their secondary windings deliver a potential corresponding to the voltage rating of the projector lamp.

As a result of these considerations, each projector can be used only with a projector lamp of a particular wattage or light output rating and a particular voltage rating, and the output or voltage ratings of the lamp used with the projector cannot be changed without detriment not only to the lamp but also to the other parts of the projector, due to the variations in heat outputs corresponding to various ratings of projector lamps.

In accordance with the present invention, a projector is provided which has the same fundamental design irrespective of being used with projector lamps of various output and voltage ratings. This is effected by the use of externally identical interchangeable lamp compartment cover components which have substantially no effect on the overall dimensions or contours of the projector. Each of these components is adapted for use with a projector lamp having a particular output or voltage rating. The interchangeable housing components do not increase or reduce the overall dimensions of the projector nor do they effect the clearance space within the projector for the projector components other than the projector lamps.

More particularly, each cover component is arranged to form the top and one side wall of the lamp compartment of the projector, and is secured to the fixed casing of the projector in a readily dismountable manner for ready interchange with other cover components. The cover components may be provided with suitable electrical components as required for properly electrically connecting any particular projector lamp or associated cooling means or transformer into the projector electrical system.

The cover component used with projector lamps of low output ratings is formed with ventilating means for up-draft of air through the lamp compartment, to cool the same and protect the other parts of the projector from overheating, by natural air circulation. The interchangeable cover component used with lamps of relatively higher output ratings has mounted therein an electric motor operated cooling means, such as a blower or fan driven by an electric motor, and also the necessary electrical connectors for properly connecting the fan or blower motor into the supply circuit of the projector. Where the projector is to be used with a projector lamp having a voltage different from that of the supply mains, such as a lamp having the advantages of a so-called "low voltage" lamp, the interchangeable cover component is provided with a transformer and electrical connections for connecting the transformer into the electrical circuit of the projector. This particular cover component is further provided with an insulating wall between the transformer and the other parts of the projector, and with means for cooling the projector lamp by up-flow or up-draft of air through the lamp compartment.

For an understanding of the principles of the invention, reference is made to the following description of typical embodiments thereof as illustrated in the accompanying drawings. In the drawings:

FIG. 8 is a side elevational view of the projector shown in FIG. 1; and

FIG. 9 is a plan view thereof.

Figure 1:
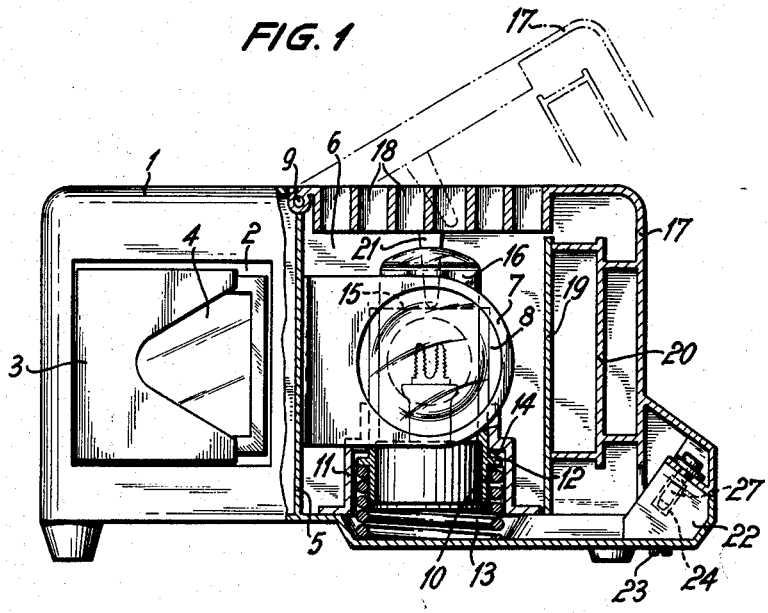
FIG. 1 is a front elevational view, partly in section, of a slide projector provided with a projector lamp having a relatively low output rating.
Figure 2:
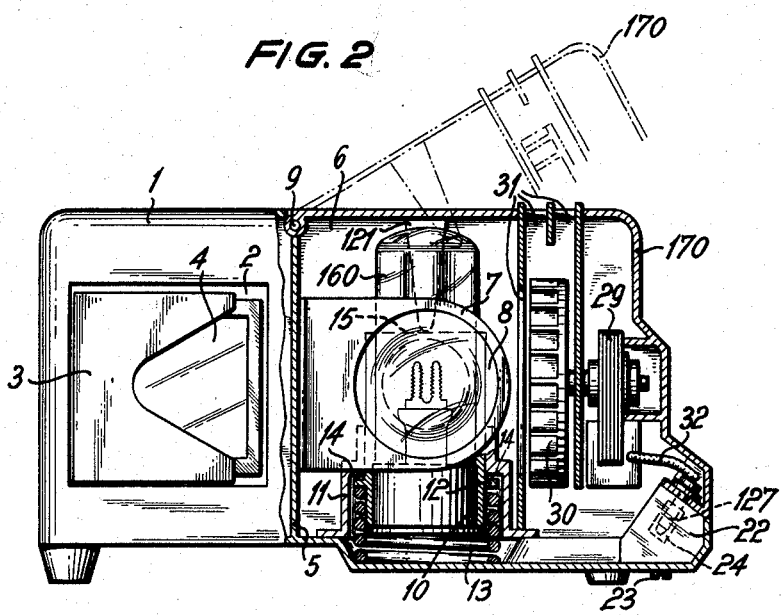
FIG. 2 is a view similar to FIG. 1 of the slide projector provided with a projector lamp having a relatively high output rating and with the lamp compartment cover component being provided with mechanical cooling means for the lamp.
Figure 3:
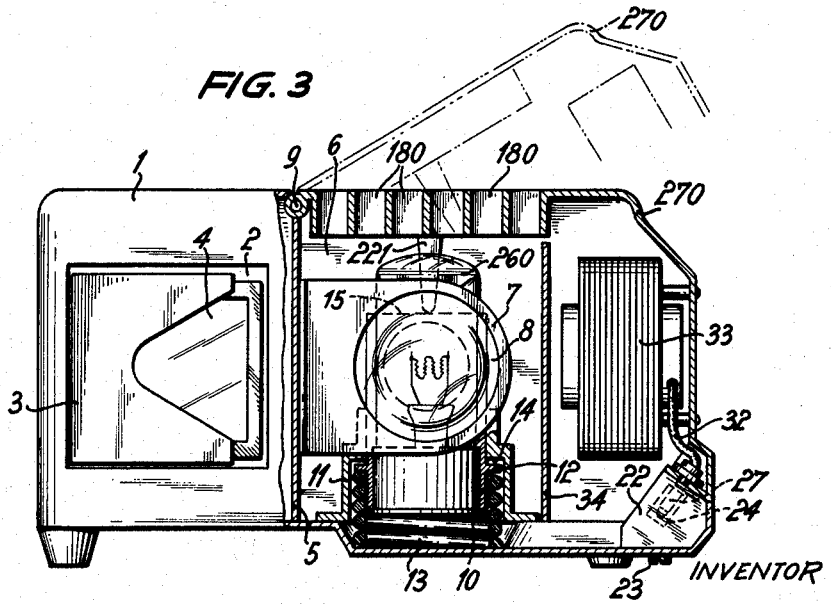
FIG. 3 is a view similar to FIG. 1, of the slide projector provided with a low voltage lamp, and with the lamp compartment cover component carrying a transformer for providing the rated lamp voltage from the supply means.

Except for the difference in size and types of projector lamps and the corresponding differences in the internal arrangements of the interchangeable lamp compartment cover components, the projectors shown in FIGS. 1, 2, and 3 are identical. In any event, and even considering the differences in the output or voltage ratings of the lamps, and the differences in the internal arrangements of the interchangeable components, the three projectors are identical as to exterior configuration and as to the slide storage means and the optical system. Consequently, the first part of the following description will apply equally to the projectors shown in each of FIGS. 1, 2, and 3.

Referring to FIGS. 1, 2, 3, 8 and 9, the housing or casing of the projector is generally indicated at 1, and is arranged to have the different lamp compartment cover components interchangeably secured thereto. Casing 1 is formed with a slide storage passage or compartment extending therethrough in a direction parallel to the optical axis of this projector, and this compartment 2 is arranged to receive a magazine 3 containing slides 4 which may be selectively shifted from the magazine, into operative position across the optical axis of the projector, and returned to the magazine 3. The means for shifting slides 4 are old and well-known, and consequently have not been illustrated in detail.

The portion of the casing containing the compartment 2 for the magazine 3 is separated by a partition 5 from the lamp compartment generally indicated at 6. Supporting means 7, for the optical system 8 associated with the proector lamp, are mounted on partition 5 for ready removal therefrom, so that the optical system may be changed, if desired. The upper edge of partition 5 is formed or fitted with hinge components 9 by means of which the interchangeable lamp compartment cover components may be disengageably and interchangeably connected to the housing or casing 1.

Lamp compartment 6 contains a socket or mounting unit 10 for the projector lamp, and socket 10 is mounted within a casing 11 for displacement relative to casing 11 along the axis of the parts 10 and 11. Casing 11 is fixed to the base of housing 1, and a compression coil spring 13, embracing socket 10 within casing 11, is engaged between the base of housing 1 and a collar 12 on unit 10. Spring 13 biases unit 10 upwardly of casing 11 so as to maintain collar 12 pressed against a shoulder 14 formed on the upper portion of the casing 11. The unit 10 is formed with an extension or abutment 15 projecting above the casing 11 and arranged to be abutted by co-operating means on the interchangeable lamp compartment cover components in a manner and for a purpose described more particularly hereinafter.

Referring particularly to FIG. 1, as therein illustrated, the slide projector is provided with a relatively low intensity, or low output rating, projector lamp 16 mounted in socket 10, the output rating of lamp 16 being such that the latter does not require any special mechanical cooling. The lamp compartment 6 is closed at its top and one side by a cover component 17 which is interchangeably connected into the hinge components 9 on the partition 5. In the arrangement shown in FIG. 1, the top wall of the component 17 is formed as a ventilator or exhaust screen 18 positioned above the lamp 16. Screen 18 provides for up-flow of air heated by the lamp 16, and the natural air circulation thus produced within the lamp compartment 6 is adequate for appropriate cooling of the relatively low intensity projector lamp 16. Spaced partitions 19 and 20, integral with the component 17, act as insulators preventing heating of the side wall of the component 17 by the radiation heat of the lamp 16.

The spacing of the top wall of housing component 17, which contains the ventilator 18, from the base of housing or casing 1 is so selected that another lamp, having a height greater than that of lamp 16 and which may have a higher output rating, can be substituted for the lamp 16. However, in such case, the housing component 17 could not be seated in the closed position illustrated in solid lines in FIG. 1.

The top wall of the component 17 is formed with a projection 21 extending downwardly therefrom and, in the closed position of housing component 17, projection 21 engages the abutment 15 of lamp socket 10, and presses this socket downwardly to some extent. The relation of parts is such that, when projection 21 is engaged with part 15 of mounting unit 10, and when the component 17 is closed, the lamp socket 10 is retained in such a position, with spring 13 compressed, that the central luminous spot of the lamp 16 is aligned with the optical axis of the optical system 8.

Figure 4:
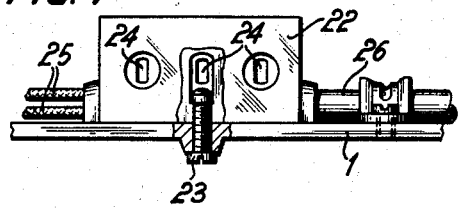
FIG. 4 is a side elevational view illustrating the contact arrangement.
Figure 6:
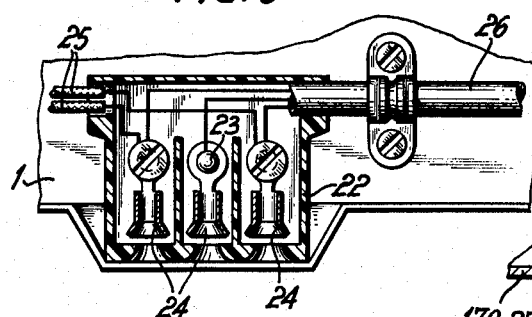
FIG. 6 is a transverse sectional view through the contact arrangement carried by the projector casing.

A contact mounting or housing 22, of suitable dielectric material, is secured by a screw 23 to the base of housing 1. As best seen in FIGS. 4 and 6, spring contacts are fitted within the contact block or housing 22 and are electrically connected to cables 25 and 26. The securing screw 23, which fastens the housing 22 to the base of the casing 1, is electrically connected with the central one of the three spring contacts 24. This central contact is connected with the ground wire or conductor of cable or cord 26 so that the entire projector casing is grounded by means of screw 23.

Figure 5:
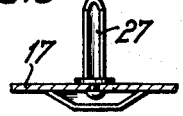
FIG. 5 is a partial sectional view illustrating a latch for the interchangeable lamp compartment cover components.

As best seen in FIG. 5, a contact pin 27 is secured to cover component 17 in such a position that it engages with the central and grounded spring contact 24, when cover component 17 occupies the closed position shown in the drawings to ground component 17. In addition, contact pin 27 cooperates with spring contact 24 to form a latching device retaining the component 17 in the closed position. FIG. 1 illustrates, in broken lines, a portion of the cover component 17 in its open position.

Referring to FIG. 2, the lamp compartment cover component is indicated at 170 and is interchangeable with the component 17 of FIG. 1, component 170 having exactly the same external dimensions and contours as the component 17. In this case, however, the lamp 160 used in the projector has a substantially higher output rating than the lamp 16 used in the example of FIG. 1. Consequently, mechanical cooling is required for the lamp 160. For this purpose, the component 170 has mounted therein, as on its side wall, an electric motor-powered driving arrangement, indicated at 29, which drives a blower 30. Depending upon the direction of rotation of blower 30, the latter will either force air from the lamp compartment 6 through apertures 31 in the top wall of housing component 170, or will draw cool air through these apertures and direct the same over the lamp 160.

The top wall of component 170 has a projection 121 corresponding to the projection 21 of the arrangement shown in FIG. 1 and functioning in exactly the same manner to assure proper alignment of the luminescent spot of lamp 160 with the optical axis of the projector. Cover component 170 also carries a contact pin 127, for engagement with grounded spring contact 24, in the same manner as does cover component 17 of the arrangement shown in FIG. 1.

Figure 7:
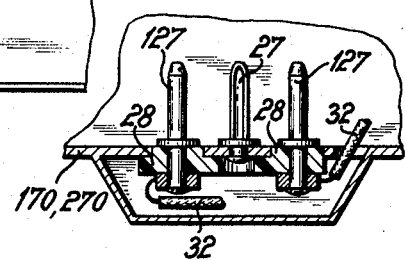
FIG. 7 is a transverse sectional view through the cooperating contact arrangement carried by the lamp compartment cover component.

Furthermore, as shown particularly in FIG. 7, two additional contact pins 127 are mounted through dielectric bushings 28 secured in the component 170. These contacts are connected with the electric motor unit 29 by means of cable 32, and engaged with the two outer spring contacts 24 of FIG. 6 when component 170 is in the fully closed position. This engagement establishes electrical connection between the electrical system of the projector and the electric motor unit 29.

In the example shown in FIG. 3, the slide projector has mounted therein a lamp 260 whose voltage rating differs from that of the usual household or commercial supply, and generally is of a much lower value than the household or commercial supply. In this instance, there is substituted for the cover component 17 of FIG. 1, or for the cover component 170 of FIG. 2, a cover component 270 which again is interchangeably connected into the hinge means 9 and has external dimensions and contours identical with those of components 17 and 170. Component 270 supports, on its side wall, a transformer 33 having a rating such as to convert the voltage of the domestic or commercial supply to the proper voltage for operating the lamp 260. The electrical coupling between the electrical system of the projector and the transformer 33 is provided by the contact arrangement previously described in connection with FIG. 2. In this case also, the contact arrangement serves as a mechanical latching mechanism for holding the housing component 270 in the closed position.

To remove heat generated by lamp 260, the top wall of the housing is formed with a ventilating screen 180 for up-flow of heated air from the lamp compartment 6. Also, the top wall of component 270 has a projection 221 corresponding to the projections 21 and 121 and functioning in the same manner to properly position the lamp 260 with respect to the optical axis of the projector. A heat insulating partition 34, protects transformer 33 against the heat radiated from lamp 260.

In the case of the example shown in FIGS. 2 and 3, it should be noted that the number of the spring contacts 24 provided in the contact mounting 22, and of the co-operating contacts 27 and 127 mounted on the cover components such as 170 and 270, is controlled, in each case, by the number of electrical connections to be established in the particular case. Consequently, more than three pairs of cooperating contacts may be provided.

As an alternative to the embodiments illustrated herein, the lamp base 10 need not be mounted in the projector casing 1, nor mounted therein in a manner permitting it to shift vertically under the influence of the spring 13 and the abutments 21, 121, or 221. For example, the lamp mounting 10 can be fixedly mounted on the interchangeable cover components 17, 170, and 270, and so spatially related thereto that any particular lamp, such as 16, 160, or 260, would occupy the proper position with respect to the optical system 8 when the associated cover component 17, 170, or 270, is in the closed position. In such case, the electrical supply to the projector is connected to the cover component 17, 170, or 270, and supplies electrical current to the electrical parts mounted on these components as well as through contacts, such as 127 and 24, to the electrically operated parts of the projector more or less permanently mounted in casing 1.

By reference to FIGS. 8 and 9, which show the external appearance of the projector of FIG. 1, it will be noted that the projector has an object lens 100 and a slide shifter 101. Furthermore, and as best seen in FIGS. 8 and 9, the cover component 17 forms the top and outer side wall of the lamp compartment, and forms only a part of the top wall and a part of the side wall of the projector casing. The same is true of cover components 170 and 270.

FIGURES 8 and 9 show the projector as per FIGURE 1 in lateral and plain views respectively. The projection lens inserted into the projector 1 is indicated at 100 and the slide changer is indicated at 101. As may be recognized the housing component 17 which is interchangeably fitted to the housing 1 is so largely dimensioned that it almost fully closes the space for the lamp to the top and to one lateral side. The outer partitions of the component 17 consequently only form parts of the top and the lateral partitions of housing 1.

The components 170 and 270 bearing the blower and the transformer respectively are equally dimensioned.

While specific embodiments of the invention have been shown and described in detail to illustrate the application of the principles of the invention, it will be understood that the invention may be embodied otherwise without departing from such principles.

What is claimed is:
1. In a slide projector having an objective and slide shifting means, and arranged to be used with projector lamps at different ratings, a casing having means defining a slide storage compartment and partly defining a lamp compartment separated from said slide storage compartment by a partition, and including a base, side, end and top walls forming a cover; said top wall and one side wall being cut away, in the area of said lamp compartment, to form a continuous opening extending laterally in said top wall and substantially vertically in said one side wall; a projector lamp socket adjustably positioned in said lamp compartment; a cover component having a top wall section and a side wall section conforming to the cut away portion of said top wall and said one side wall, respectively, and arranged to seat in said opening to complete the cover enclosure, said cover component being designed for use with a projector lamp of a respective rating; cooperating means on said casing and on said cover component operable to disengageably releasably latch said cover component in cover-completing position on said casing; a ventilating grid opening through one section of said cover component; and inwardly projecting abutment means on said cover component engaged with said lamp socket, upon positioning of said cover component in cover enclosure completing position, to adjust the latter for proper alignment of the respective lamp associated therewith with said objective; the effective length of said abutment means being coordinated with the constants of the associated lamp.

2. In a slide projector as claimed in claim 1, said component being designed for use with a projector lamp having a relatively low power rating; and partition means within said component insulating the side wall section thereof from heat from said lamp compartment.

3. In a slide projector as claimed in claim 1, said projector lamp socket being mounted for axial adjustment in a direction toward said top wall; and means biasing said socket toward said top wall; the lamp socket adjusting abutment means projecting downwardly from the top wall section of said component to engage the upper end of said socket to adjust the same axially against the force of said biasing means.

4. In a slide projector as claimed in claim 3, said biasing means including a coil spring embracing said socket and disposed between said base and a collar on said socket; and means engageable with said collar to limit movement of said collar toward said top wall.

5. In a slide projector as claimed in claim 1, an electrically operated ventilating means in said component and arranged to circulate air relative to said lamp compartment and said ventilating grid opening; said cooperating means including contacts on said cover component electrically connected to said ventilating means and engageable with contacts on said casing connected to the electric circuitry of said casing.

6. In a slide projector as claimed in claim 1, said cover component being designed for use with a relatively low voltage projector lamp; and a transformer mounted within said cover component; said cooperating means including contacts on said cover component electrically connected to said transformer and engageable with contacts on said casing connected to the electric circuitry of said casing.

7. In a slide projector as claimed in claim 1, said cooperating means including interfitting hinge sections on the inner edge of the top wall section of said cover component and on the adjacent edge of said top wall; and further including releasable latch means on the lower edge of said side wall section of said cover component and said casing.

References Cited in the file of this patent
UNITED STATES PATENTS

| | | |
|---|---|---|
| 2,027,680 | Debrie | Jan. 14, 1936 |
| 2,350,761 | Hutchison | June 6, 1944 |
| 2,862,319 | Lipfert | Dec. 2, 1958 |

FOREIGN PATENTS

| | | |
|---|---|---|
| 205,792 | Great Britain | May 1, 1924 |
| 902,177 | France | Nov. 27, 1944 |